United States Patent
Tanaka et al.

[15] 3,682,067
[45] Aug. 8, 1972

[54] CAMERA WITH A RETRACTABLE LENS BARREL

[72] Inventors: Harumi Tanaka; Susumu Fukuda, both of Nishinomiya, Japan

[73] Assignee: Fuji Photo Film Co., Ltd., Nakamima, Minami Ashigara-Shi Kanagawa, Japan

[22] Filed: July 10, 1970

[21] Appl. No.: 53,715

[30] Foreign Application Priority Data

July 11, 1969    Japan .....................44/65670

[52] U.S. Cl. .........................................95/39, 95/46
[51] Int. Cl. .............................................G03b 17/04
[58] Field of Search.........................95/37, 39, 45, 46

[56] References Cited

UNITED STATES PATENTS

| | | | |
|---|---|---|---|
| 2,531,376 | 11/1950 | Langdon | 95/31 PF |
| 2,637,254 | 5/1953 | Faulhaber | 95/39 |
| 2,353,227 | 7/1944 | Drotning | 95/44 C |
| 3,062,102 | 11/1962 | Martin | 95/45 X |
| 3,504,605 | 4/1970 | Scudder et al. | 95/39 X |

*Primary Examiner*—Samuel S. Matthews
*Assistant Examiner*—Fred L. Braun
*Attorney*—Sughrue, Rothwell, Mion, Zinn and Macpeak

[57] ABSTRACT

A photographic camera having a retractable lens barrel interlocked with a slide plate in the camera. The retractable lens barrel is brought to a drawn-out position for taking pictures in response to the sliding movement of the slide plate in the camera. The stroke of the interlocking member is larger than that required for drawing out the lens barrel to the predetermined focusing position and the over stroke of the interlocking member is absorbed by a spring mounted thereon and a loose connection between the lens barrel and the interlocking member permitting the same.

5 Claims, 3 Drawing Figures

PATENTED AUG 8 1972

3,682,067

INVENTORS
HARUMI TANAKA
SUSUMU FUKUDA

BY *Sughrue, Rothwell, Mion, Zinn & Macpeak*

ATTORNEYS 3,682,067

CAMERA WITH A RETRACTABLE LENS BARREL

BACKGROUND OF THE INVENTION

1. Field of the Invention

The present invention relates to a camera having a retractable lens barrel, and in particular to a photographic camera having a retractable lens barrel in which the lens barrel is accurately positioned at the prescribed position for taking pictures.

2. Description of the Prior Art

There are known cameras in which the lens barrel is interlocked with a slide plate in the camera which in turn is connected to a sidewardly sliding camera cover so that the lens barrel may be drawn out and retracted in response to the sliding movement of the slide plate as moved by the cover of the camera. Among such cameras, there are types in which the lens barrel is drawn out in response to the lateral movement of the slide plate in a direction at right angles to the optical axis of the picture taking lens mounted within the same. Since it is very important to locate the lens barrel at precisely the right position for focusing the image on the film in the photographic camera art, the mechanism interlocking the lens barrel with the slide plate must be carefully designed.

SUMMARY OF THE INVENTION

The camera having a retractable lens barrel of the present invention is provided with an improved means for precisely locating the lens barrel at the right focusing position. In order to locate the lens barrel at the right position, there is provided an interlocking member between the lens barrel and the slide plate having a stroke larger than that required for locating the lens barrel just at the prescribed position. The interlocking member is provided with a spring for absorbing the overstroke thereof.

During sliding the slide plate toward the position for taking pictures, the lens barrel is drawn out to the position for focusing and during sliding movement of the slide plate the lens barrel is brought up to the right position for focusing. After the lens barrel is located at the right position, further movement of the slide plate is not transmitted to the lens barrel but absorbed by the spring provided on the interlocking member connected with the slide plate and permitted by a loose connection between the lens barrel and the interlocking member. Thus, the lens barrel is brought to the right position without fail.

In light of the foregoing observation and description of the present invention, it is an object of the present invention to provide a camera in which the lens barrel is precisely located at the right position for focusing.

It is another object of the present invention to provide a photographic camera with a retractable lens barrel in which the lens barrel is automatically brought to the right position for focusing by pulling a cover of the camera sidewards for taking pictures.

With the foregoing summary of the invention in mind, a preferred embodiment of the invention is described below taken in conjunction with the following drawings.

DESCRIPTION OF THE PREFERRED EMBODIMENT

Figure 1:
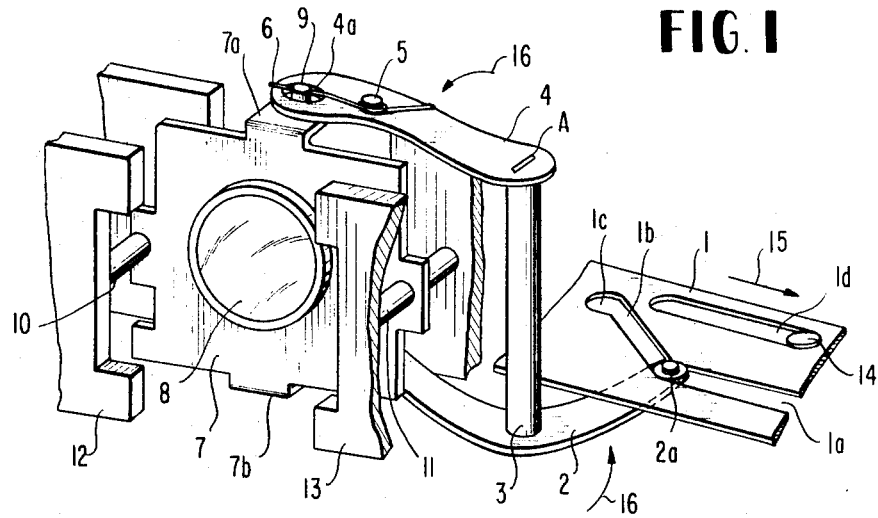
FIG. 1 is a fragmentary perspective view of the camera in accordance with the present invention.
Figure 2:
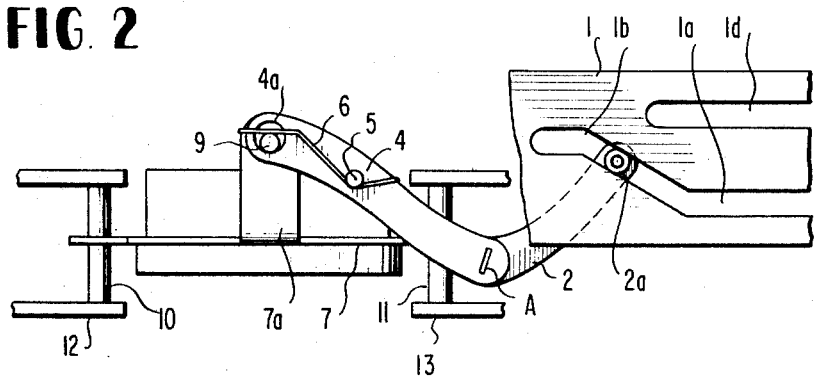
FIG. 2 is a fragmentary plan view of the essential portion of the camera in accordance with the present invention while drawing out the lens barrel.

Now referring to FIG. 1 showing the camera of the present invention at the start of the drawing out of the lens barrel, the slide plate 1 connected with another element of the camera such as a sliding cover or the like, and is made to be slid sidewardly as indicated by an arrow in the drawing. The slide plate 1 is provided with a straight slot 1d receiving a stationary pin 14 fixed in the camera for guiding the slide plate along a straight path as indicated by arrow 15. The slide plate 1 is further provided with a long slot consisting of a pair of straight slot portions 1a and 1c at the ends thereof, extending parallel to said straight slot 1d for guiding the slide plate, and a skew slot portion 1b connecting the pair of straight slot portions 1a and 1c therebetween. An interlocking lever 2 is pivotally mounted on a stationary shaft 3 extending perpendicular to the slide plate 1. At an end of the interlocking lever 2 is provided an idle roller 2a which is in engagement with the long slot. The other end of the lever 2 is engaged with the lens barrel. The detail construction of the other end of the lever 2 is omitted, since it is just the same as that of the lever 4 to be described below. The lever 4 is secured to the stationary shaft 3 at one end thereof and extends in parallel with and to the other end of the interlocking lever 2. The other end of the lever 4 is provided with an elongated hole 4a which has a larger diameter in the direction parallel to the optical axis of the lens of the camera than pin 9 received thereby. In the camera, a picture taking lens 8 is secured to a lens carrying plate 7 extending perpendicular to the optical axis of the taking lens 8. The lens carrying plate 7 is guided by a pair of guide pins 10 and 11 extending in parallel with the optical axis of the taking lens 8. The lens carrying plate 7 has at the top and the bottom thereof a pair of bent lugs 7a and 7 b. The bent lugs 7a and 7b are bent at right angles to the lens carrying plate 7 and each is provided with a pin 9 fixed thereto. The pin 9 on the lug 7a is received within the elongated hole 4a at the end of the lever 4. On the upper lever 4 is secured a fixed pin 5 for holding a spring 6 which is engaged with the pin 9 at an end thereof and with the lever 4 itself at the other end thereof. This results in the spring 6 urging the lens carrying plate 7 forward. At the end of the guide pins 10 and 11, there are provided a pair of stopper plates 12 and 13 which abut the lens carrying plate 7 when the lens carrying plate 7 is drawn out to its fullest extent.

The shape of the slot provided on the slide plate 1 is so formed that the stroke of the swinging movement of the levers 4 and 2 are larger than that required for moving the lens carrying plate 7 to the position where it abuts the stopper plates 12 and 13. The position where the lens carrying plate 7 is stopped by the stopper plates 12 and 13 is the position for obtaining the sharpest image on the film in the camera.

In operation, when the photographer is going to take a picture, the slide plate 1 is slid in the direction shown by the arrow 15 in FIG. 1. For this purpose, the slide plate 1 may be interlocked with the slidable camera cover (not shown) which covers the camera body as a whole with the retracted lens barrel therein and exposes the lens barrel when pulled sideward. Alternatively, the slide plate 1 may be interlocked with a knob operable from outside. In response to the sliding movement of the slide plate 1, the interlocking lever 2 is moved in the counterclockwise direction as indicated by arrow 16 in FIG. 1 since the idle roller 2a in the end of the lever 2 is guided by the long slot on the slide plate 1. That is, when the idle roller 2a comes to the end of the straight slot portion 1a and enters the beginning of the skew slot portion 1b, the interlocking lever 2 starts to rotate about the stationary shaft 3. At the same time when the interlocking lever 2 starts to be rotated, the upper lever 4 also starts to be rotated in the same direction as indicated by arrows 16 in FIG. 1.

Figure 3:
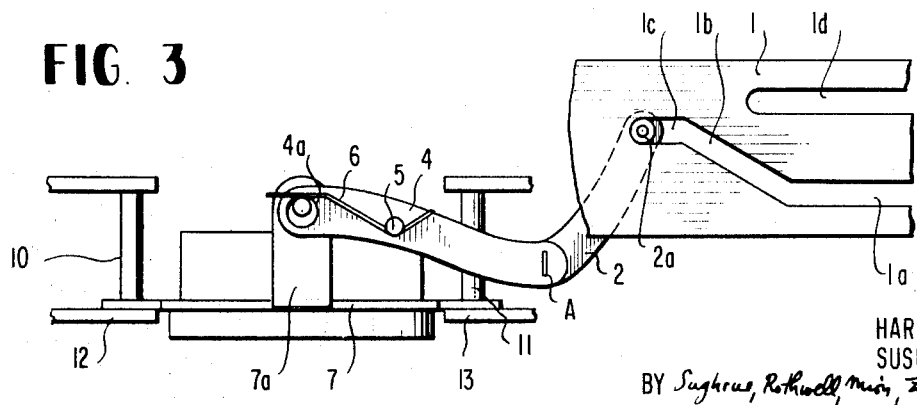
FIG. 3 is a fragmentary plan view of the essential portion of the camera in accordance with the present invention as shown in FIG. 2 at the end of the barrel drawing out operation thereof.

Since the stroke of the swinging movement of the levers 2 and 4 is made larger than that required for bringing the lens carrying plate 7 up to the position where it is stopped by stopper plates 12 and 13, the lens carrying plate 7 is stopped by the stopper plates 12 and 13 during the swinging movement of the levers 2 and 4. That is, when the lens carrying plate 7 is stopped by the stopper plates 12 and 13, the idle roller 2a is still engaged and guided by the skew slot portion 1b. Then, the slide plate 1 further slides sideward, the interlocking lever 2 is further rotated in the counterclockwise direction together with the upper lever 4. Since the lens carrying plate 7 is stopped by the stopper plates 12 and 13, this further rotation of the levers 2 and 4 in the counterclockwise direction is not transmitted to the lens carrying plate 7 but absorbed by the spring 6 and permitted by the elongated hole 4a of the lever 4. At this point, the idle roller 2a is brought into engagement with the last straight slot portion 1c, as shown in FIG. 3 and rotation of levers 2 and 4 ceases.

What is claimed is:

1. A camera having a retractable lens barrel comprising:
    a camera body,
    a member slidable sideways in said camera body relative to said lens barrel,
    means carrying said retractable lens barrel,
    means for interlocking said lens barrel carrying means with said slidable member,
    means for providing a larger stroke for said interlocking means than that required for moving said lens barrel carrying means to the position where the image is focused on the film in said camera,
    stop means for stopping movement of said lens barrel at the image focusing position,
    overtravel means interconnecting said lens barrel carrying means and said interlock means, and
    means associated with said overtravel means for biasing said lens barrel towards said stop means, thereby permitting restrained overtravel of said interlocking means.

2. A camera with a retractable lens barrel as defined in claim 1 wherein said slidable member is a plate provided with a slot having a skew slot portion inclined to the sliding direction thereof, said interlocking means comprises a lever having at an end thereof a pin engaging said slot and carrying at the other end thereof, an elongated hole extending in the direction of rotation thereof, and said lens barrel carrying means comprises a member to which said lens barrel is secured and having a pin positioned within said elongated hole to define said overtravel means.

3. A camera as defined in claim 2 wherein said slot is a long slot consisting of a pair of straight slot portions extending parallel to the sliding direction thereof with said skew slot portion connecting said pair of straight slot portions therebetween.

4. A camera as defined in claim 1 wherein said slidable member in said camera is connected with a knob operable from outside of the camera body.

5. A camera as defined in claim 1, wherein said slidable member in said camera is connected with a cover of the camera.

* * * * *